United States Patent
Winkelvos et al.

(10) Patent No.: US 12,079,090 B2
(45) Date of Patent: Sep. 3, 2024

(54) METHOD FOR DATA BACKUP IN A VEHICLE, CORRESPONDING CONTROL DEVICE, COMPUTER PROGRAM AND MOTOR VEHICLE

(71) Applicant: Volkswagen Aktiengesellschaft, Wolfsburg (DE)

(72) Inventors: Timo Winkelvos, Sickte (DE); Aljoscha Fernandez, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 53 days.

(21) Appl. No.: 17/871,503

(22) Filed: Jul. 22, 2022

(65) Prior Publication Data

US 2023/0029245 A1 Jan. 26, 2023

(30) Foreign Application Priority Data

Jul. 23, 2021 (DE) .......................... 102021207956.3

(51) Int. Cl.
*G06F 11/14* (2006.01)
*H04L 9/32* (2006.01)

(52) U.S. Cl.
CPC ............ *G06F 11/1458* (2013.01); *H04L 9/32* (2013.01)

(58) Field of Classification Search
CPC ... H04L 2209/84; H04L 63/10; H04L 9/0822; G06F 21/33; G06F 21/62; G06F 12/1408; G06F 2212/1052; G06F 21/00
USPC ....................................................... 707/802
See application file for complete search history.

(56) References Cited

U.S. PATENT DOCUMENTS

| | | | |
|---|---|---|---|
| 10,397,216 B2 * | 8/2019 | Agrawal | G06F 11/1464 |
| 2005/0045713 A1 | 3/2005 | Ko | |
| 2008/0107274 A1 * | 5/2008 | Worthy | G06F 21/602 380/278 |
| 2013/0198813 A1 * | 8/2013 | van Roermund | G06F 21/30 726/4 |
| 2015/0332043 A1 * | 11/2015 | Russello | G06F 11/3466 726/22 |
| 2019/0340850 A1 | 11/2019 | Chiron et al. | |
| 2020/0274892 A1 | 8/2020 | Kim et al. | |
| 2021/0288822 A1 * | 9/2021 | Sorensen | H04L 9/321 |

FOREIGN PATENT DOCUMENTS

| | | |
|---|---|---|
| DE | 102014201038 A1 | 7/2015 |
| DE | 102014221977 A1 | 4/2016 |

* cited by examiner

*Primary Examiner* — Hung T Vy
(74) *Attorney, Agent, or Firm* — Peter Zura; LOZA & LOZA, LLP

(57) ABSTRACT

Data backup in a vehicle, where a datum is generated by a function implemented on a first control device of the vehicle. The securing of the datum generated is determined using the configuration data stored in a first control device. If the datum generated is to be protected, it is cryptographically marked and/or encrypted. The cryptographically marked and/or encrypted datum is stored in a memory of the first control device. In addition the cryptographically marked and/or encrypted datum or a value derived therefrom is sent over an electronic network of the vehicle to at least one second control device, received by the latter and stored in a memory of the second control device.

20 Claims, 4 Drawing Sheets

METHOD FOR DATA BACKUP IN A VEHICLE, CORRESPONDING CONTROL DEVICE, COMPUTER PROGRAM AND MOTOR VEHICLE

RELATED APPLICATIONS

The present application claims priority to German Patent App. No. 10 2021 207 956.3, filed on Jul. 23, 2021 to Winkelvos, et al., the contents of which is incorporated by reference in its entirety herein.

TECHNICAL FIELD

The present disclosure relates to a method for data backup in a vehicle. Furthermore the present disclosure relates to a control device that executes such a method, a computer program to execute the method and a motor vehicle that is arranged to execute such a method or has multiple such control devices.

BACKGROUND

In the automotive field, there is a significant need to effectively protect data present in the vehicle from loss, manipulation or unauthorized access. Thus, contemporary vehicles have a plurality of control devices in which various data that are considered worthy of protection are stored in order to make them available for, for example, forensic accident reconstruction or as a security measure in the event of an attempt at manipulation.

Different approaches are known for storage of the data. In the simplest case, the data are stored only locally in a non-volatile memory of the respective control device. This is easy to implement but also easy to manipulate. In order to prevent tachometer manipulation to indicate a lower kilometrage in used cars, or at least make it significantly more difficult, the so-called distance protection is used. Here data that are used to calculate the distance traveled are sent to multiple control devices in the vehicle and redundantly stored there in a cryptographically secure memory area. If, for example, the kilometrage is then overwritten in only one of the control devices, then by means of comparison of the stored kilometrages, a manipulation may be recognized. However, this distance protection is technically very costly and is therefore not suitable as a general approach to secure distributed data storage in the vehicle.

Furthermore in an event data recorder (abbreviated EDR) provided in the vehicle, which has meanwhile been legally mandated in some countries, is relevant for accident reconstruction and therefore it collects data worthy of protection from various control devices in the vehicle in a manner that is complex, and stores them centrally in a memory secured against power failure. Such an EDR is customarily realized as an additional function in a control device and must therefore be integrated into the control device provided by the vehicle manufacturer or its supplier during the development as hardware and software. But this method, too, is vulnerable to technical defects and manipulations. Thus the aforementioned EDR is frequently integrated into the airbag control device so that the storage of the data is carried out only in a single control device and data relevant to an accident can be removed by replacing the airbag control device.

It is further known from other areas of information technology to use distributed databases and so-called blockchain technology for the distributed storage of data. However, approaches that integrate this method into control devices are costly and have a high demand for hardware resources. Furthermore, these cannot be embedded seamlessly into the automobile-specific standards and systems architecture and would therefore entail significant modifications to control device basic software and to the functions to be placed on them. Moreover, retroactive integration into already-existing control devices would scarcely be possible.

Based on the disadvantages of this known method distributed storage of the data is usually omitted or a complex individual solution similar to the distance protection is developed.

One method for storage of data in a motor vehicle is disclosed in DE102014221977A1, in which a central or distributed data memory in the vehicle network is made available to the control devices connected to the vehicle network as a local memory. To this end application software executed on a control device connects over the vehicle network with the data memory and logically connects the data memory to the control device and can access the connected data memory over the vehicle network.

US20200274892A1 describes a method in which in a vehicle network a certificate is transmitted from a first control device to multiple second control devices when these are activated for the first time. Encrypted inherent information is then received by the second control devices, which was encrypted with a public key associated with the certificate and is decrypted and stored with a private key associated with the certificate. Thereupon in the event of a suspicious control device, an inherent information may be transmitted by the first control device, with the certificate associated with the first control device, to this suspected control device. Inherent information then received from the suspicious control device, encrypted with the public key is then decrypted with the private key and compared with the previously stored inherent information. If a deviation is thus detected, the suspicious control device is classified as an abnormal control device.

In US20050045713A1 a system for preventing manipulation of recorded accumulated running distance is provided, in which multiple memory units are provided, in which accumulated driving distance data and the vehicle number are stored. If a deviation between the vehicle serial number data stored in the manipulation protection control unit and the vehicle serial number data stored in the other memory units is detected, an error message is output and deviating accumulated distance data in one of the other memory units is overwritten by the accumulated distance data in the manipulation protection unit.

SUMMARY

Aspects of the present disclosure are directed to technologies and techniques for improved data backup in a vehicle and a corresponding control device.

Certain aspects are disclosed in the features of the independent claims. Other aspects and configurations are disclosed in the subject matter of the dependent claims.

In some examples, a method is disclosed for data backup in a vehicle, comprising: generating a datum through a function implemented on a first control device of the vehicle; determining the securing of the data generated using the configuration data filed in the first control device; cryptographic marking and/or encrypting of the datum if the data generated is to be protected; storing the cryptographically marked and/or encrypted datum in a memory in of the first control device; and sending the cryptographically marked and/or encrypted datum or a value derived therefrom to at least one second control device.

In accordance with the present disclosure, a secure, authentic storage of data may be configured for which an interest in their manipulation may be assumed, and may be implemented with low coordination and implementation costs. The precise configurations of the cryptographic method and the distribution method are generic here, and nearly transparent for the function to be called up. Therefore, a high degree of variability in the method actually used is possible, without additional costs resulting from the design and development of the functions to be placed thereon. This variability also continues to exist in late phases of the product life cycle. Thus by means of subsequent loading of new configuration data, for example via online update, additional data to be protected may be determined, or already-protected data may be shifted to other methods without changes to the software of the control devices being necessary. Thus adjustment is easily made at any time even after the marketing of a vehicle model at any time.

Using cryptographic operations, the marked data may be readily authenticated. If the data are encrypted in addition, these data, after encryption, should not be filed either on a first control device or on a second control device in a secure memory area. In that the cryptographic key used therefor was generated in advance by the manufacturer, it is ensured that even in the case of damage to or loss of the control device affected, it will still be available for verifying the authenticity or for decrypting the data.

In particular, the cryptographically marked and/or encrypted datum or the value derived therefrom can be transmitted over an electronic network of the vehicle to a second control device of the vehicle.

In some examples, a method is disclosed relative to the second control device, comprising the steps of: receiving the cryptographically marked and/or encrypted datum or the value derived therefrom through the second control device; and storing the received datum or the value derived therefrom in a memory of the second control device.

Here, using the configuration data, the decision may be made as to which data should be protected.

Furthermore, the configuration data may include instructions concerning which data should be protected by means of which cryptographic methods.

Furthermore, the configuration data may include instructions concerning to which other control devices the data to be protected should be sent.

In some examples, the cryptographic marking and/or encrypting and the distributed storage of a datum is activated if a predefined event is detected.

Advantageously, the cryptographic marking and/or encrypting, and the distributed storage of a datum is activated if a warning message of a possible malfunction or a recognized attack is detected on a component of the vehicle electronics.

In some examples, a control device for use in a vehicle is disclosed, comprising: a function module for generating a datum; a data distributor module for determining the securing of the datum generated using configuration data filed in the data distributor module; a cryptography module for marking and/or encrypting a forwarded datum; a memory module for storing a cryptographically marked and/or encrypted datum; and a communication module for sending a cryptographically marked and/or encrypted datum or a value derived therefrom to at least one other control device.

Advantageously the data distributor module may be arranged, using the configuration data filed in the data distributor module, to decide whether a datum generated should be protected.

It is likewise advantageous if the data distributor module is arranged, using the configuration data filed in the data distributor module, to decide which generated data should be protected by means of which cryptographic methods.

Furthermore, the data distributor module may be advantageously arranged, using the configuration data filed in the data distributor module, to decide to which other control devices the cryptographically protected data are sent.

Further, in some examples, the communication module may be arranged to receive a cryptographically marked and/or encrypted datum or a value derived therefrom from another control device.

A computer program according to the present disclosure may include instructions that cause the one or multiple control devices of the vehicle to execute the steps of the method according to the present disclosure.

Finally, the present disclosure also discloses a motor vehicle that is arranged to execute a method according to the present disclosure or at least has a control device according to the present disclosure.

BRIEF DESCRIPTION OF THE DRAWINGS

Other features of the present disclosure may be seen from the following description and the claims in conjunction with the figures.

DETAILED DESCRIPTION

To enable a better understanding of the principles of the present disclosure, below embodiments of the present disclosure will be explained in greater detail using the figures. It is self-understood that the present disclosure is not limited to these embodiments and that the features described can also be modified or combined without departing from the scope of protection of the present disclosure as defined in the claim.

Figure 1:
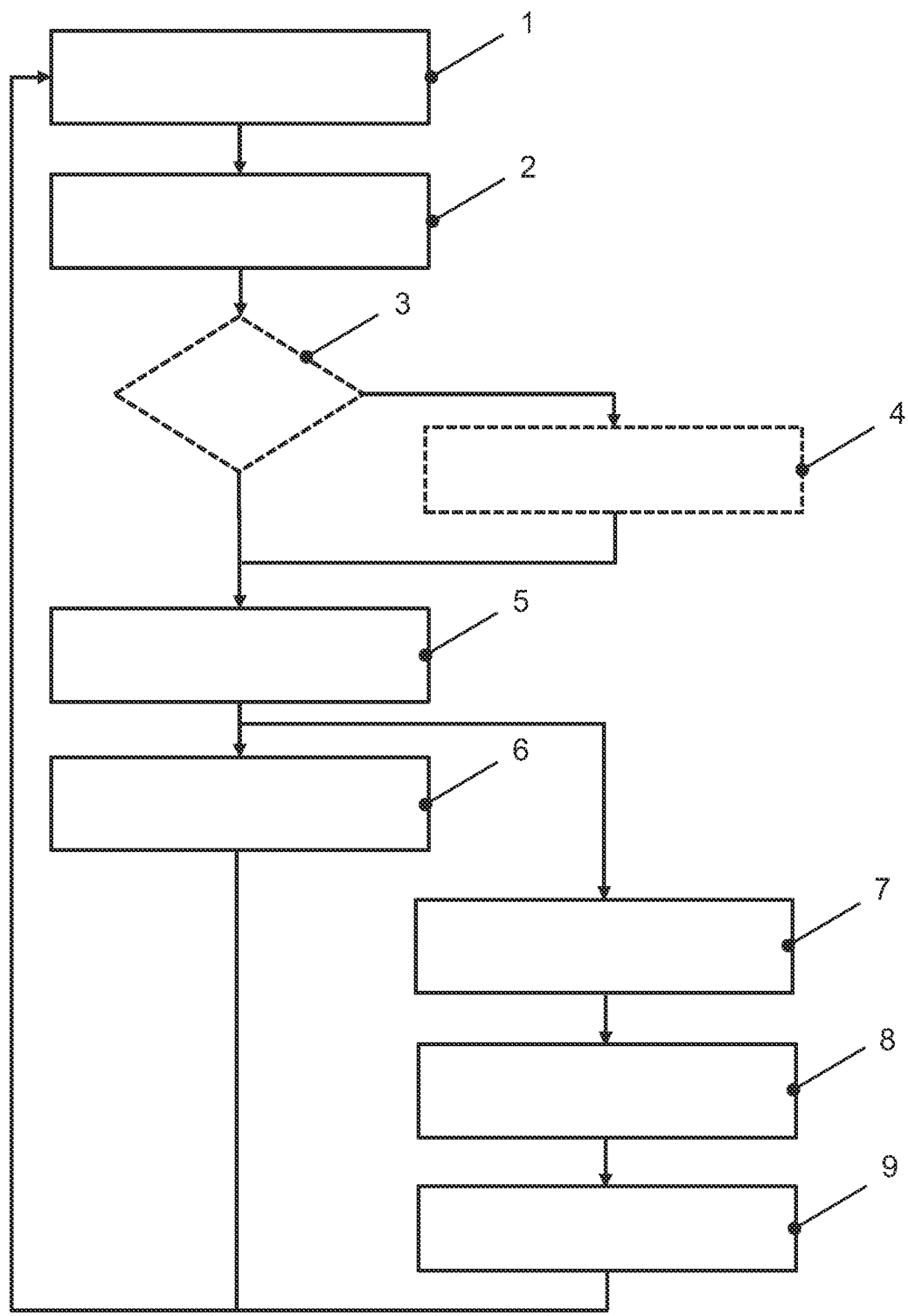
FIG. 1 shows schematically a method for data backup in a vehicle, according to some aspects of the present disclosure.

FIG. 1 shows schematically an exemplary embodiment for a method according to the present disclosure for data backup in a vehicle, such as a passenger car. In particular, the method enables manipulation-proof storage of data on vehicle use.

In a process step 1, a datum or multiple data are generated by a function implemented on a first control device of the vehicle. Thus, for example, based on signals from vehicle components, such as, in particular, the vehicle's sensors, data on the vehicle use can be generated. The data on vehicle use are understood here to include any parameters concerning the vehicle that are determined at a certain time. Thus, for example, kilometrage, information concerning times of use such as the time the vehicle is started and stopped, or the duration of the respective vehicle use ("operating hours"), GPS coordinates of the vehicle's parking location or information on accidents or servicing may be captured. Likewise, data that are obliged to be recorded pursuant to statutory requirements or information as to whether the vehicle is in manual, semi-autonomous or autonomous driving mode or when a switch is made from one of these driving modes to another driving mode can be generated.

The capturing of the data may, for example, take place at certain times or certain events such as the start or end of a vehicle drive, in the event of an accident or vehicle servicing, or even at regular intervals, without a certain event having to occur. Likewise, however, this can also take place, for example, upon changing the parameters captured by a predefined amount or at the time of activation of a vehicle component.

Then, in a process step 2, for the datum generated using configuration data filed in the first control device, it is determined whether and if so, how the backup and distribution of the datum should take place. Here the configuration data can have been imported into the control device at any time. Thus configuration data can be generated already in the production of the vehicle and inscribed in the control device. But these original configuration data can then at some later time be modified in the control device, for example to adapt to changing framework conditions, such as statutory requirements or a changed assessment of risks to which the vehicle and the data are exposed.

The configuration data can be structured in the form of a list whose entries include instructions for the backup of data to be stored. Such instructions may include in particular the following components:

1. The datum or data, or even the type or category of data on which the action defined in the respective instruction is to be applied. This may be, for example, the logical identifier of a certain memory area.

2. The type of backup, e.g., the cryptographic method to be applied in the data backup and the cryptographic key to be used therein.

3. The distribution formula:
This includes both the number≥0 of the distributed control devices or computer partition on which additional distributed storage is to take place, as well as properties or parameters concerning the type of distribution. Thus it may be defined that the distribution takes place randomly or according to the availability of the memory or in accordance with the connection speed, which can, for example, be derived from the sequence in which the connection was structured at the last start. Likewise, however, the distribution can also be set as status-dependent, depending on the last storage location, always to the same storage location or alternating. It may also be provided that data are stored distributed and authenticated if a particular event has occurred.

Whether a secure distributed data storage is to take place not statically per configuration, but instead, or additionally, depending upon a predefined event, is then decided in an optional process step. 3. Thus in case of need, this can be activated by a warning message, for example a so-called "watchdog" function for cyclical monitoring and failure detection or a so-called intrusion detection system to recognize extreme attacks. Likewise triggering could take place through an analysis by a so-called security operation centers.

If this is the case, then in another optional process step 4, the capture of events takes place, wherein upon capture of the predefined event, the process is then continued in process step 5. Likewise, however, the process may also run out without the optional process step 3 and 4, so that in this case after determining the backup and distribution using the configuration data in process step 2, the process is immediately continued in process step 5.

In process step 5 a datum to be protected is then cryptographically marked and/or encrypted. For this, recourse may be had to a cryptographic method known to the person skilled in the art. Here, the key needed for the cryptographic operations was imported into the control device in advance, for example by the manufacturer in production, via a secured transport channel, with the key having been stored in a secure memory area. By means of the cryptographic operations carried out, the data thus marked are authentic: In addition the data may also be encrypted, for example in the case of data protection-relevant data.

Following the cryptographic operations, the cryptographically marked and/or encrypted datum is then stored in a memory of the first control device in a process step 6.

In addition, in a process step 7, the cryptographically marked and/or encrypted datum or a value derived therefrom is sent over an electronic network of the vehicle to one or multiple control devices and received by these in process step 8, and finally, in a process step 9, stored in these control devices.

Here the function to be placed can allow the correct storage or authenticity of the local security-critical data to be confirmed. Thus, for example, after a restart, configuration parameters at risk for manipulation can be verified.

Further, it is also possible that instead of storing the datum or data, only one or multiple values derived therefrom, for example the signature hash value produced is distributed and stored in other control devices. Thus, it can be determined that the data were at least stored and were not manipulated, even if the data themselves cannot be restored. Likewise, the authenticity of existing data may be validated.

Figure 2:
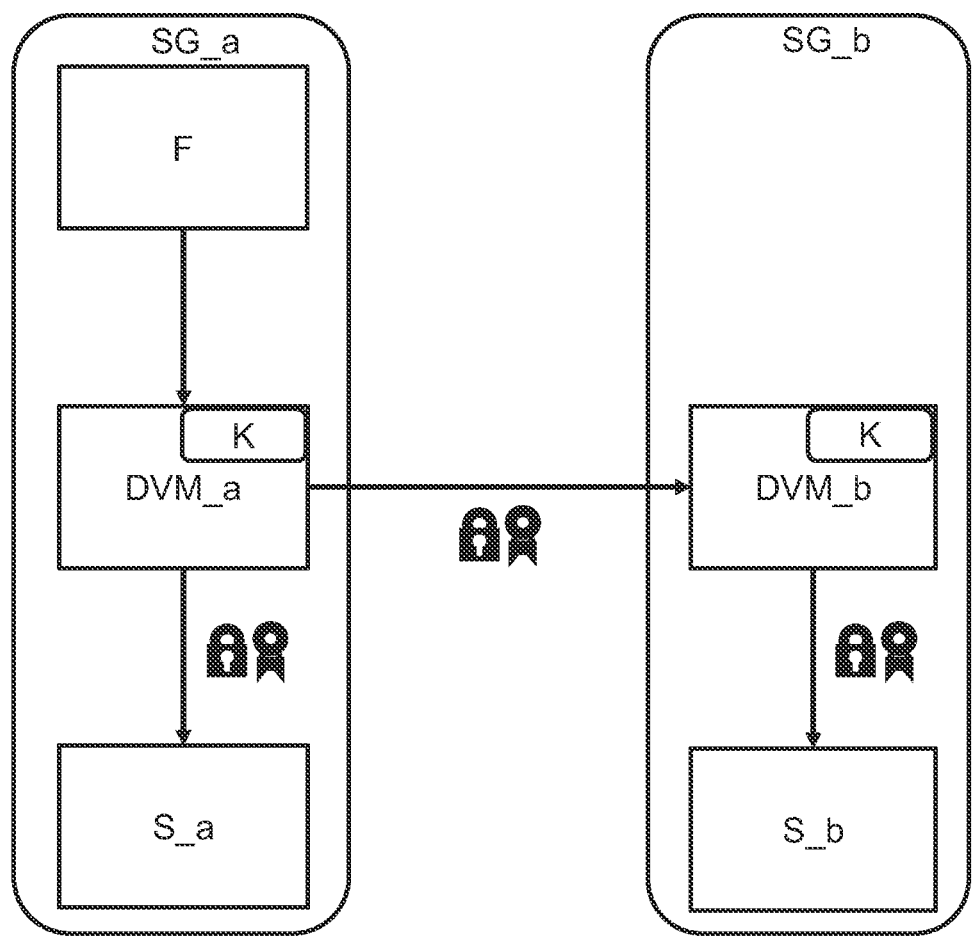
FIG. 2 shows schematically two control devices with a data storage, in which, in addition to a regular storage process in a local memory, a distributed data storage takes place according to some aspects of the present disclosure.

FIG. 2 shows schematically using two control devices SG_a and SG_b the distributed and authentic data storge according to the present disclosure. Here the two control devices each have an internal data distributor module DVM_a or DVM_b as well as a local memory module S_a or S_b.

In this example, a data distributor module is present in each of the control devices involved in the distributed data storage. Here, the data distributor module is in each case integrated into the basic software of the control device involved such that access to the internal data memory of the respective control device, e.g., reading and writing of data, are managed by this module.

The data distributor model is given a connection to one or multiple cryptography modules of the respective control device in order to be able to secure data and verify the securing. Furthermore, the data distributor module is given the opportunity, via a communication module, to send and receive data by means of a communication module over the vehicle's internal network. For reasons of brevity, the cryptography and communication module are not represented in FIG. 2.

All the data to be stored on control device SG_a are fed through the data distributor module DVM_a. The decision as to which of these data are protected by means of which cryptographic methods and to which other control devices they are sent is made by the data distributor module using a configuration K, which contains instructions or rules for the data distributor module. In this manner the need for securing can be determined "externally", without having to modify the software of the control device, so that no additional programming or software integration expense is needed for this. Furthermore, the configuration can easily be modified retroactively, for example as part of a remote update executed over the vehicle's mobile radio connection.

So now, if an internal function F writes a datum identified as worthy of protection on the first control device SG_a into the internal memory S_a of the control device SG_a, this datum is marked or encrypted by the data distributor module DVM_a located on the control device SG_a in accordance with the configuration K and sent over the vehicle network to a data distributor module DVM_b located on the second control device SG_b. The data distributor module DVM_b then stores the datum in the local S_b of the second control device SG_b.

The datum additionally stored in the local memory S_b of the second control device SG_b can then, as needed, be read again. Thus the reading may be triggered by the original function F on the first control device SG_a or by a cyclically-executed consistency verification on the part of the data distributor module DVM_a located on the control device SG_a. Likewise, however, the datum can also be read again for forensic purposes.

Through the cryptographic securing by means of a cryptographic key that is stored only in control device SG_a and in the manufacturer's key management system, it can thus be determined that the datum comes from the control device SG_a and was not manipulated.

It can also be provided that the function to be placed requests the protected and distributed storage in a targeted manner by calling the data distributor module. The function can thereby transmit the desired type of securing and storage together with the data. But even in this case the details of the respective method and the implementation continue to be abstracted by the function.

Figure 3:
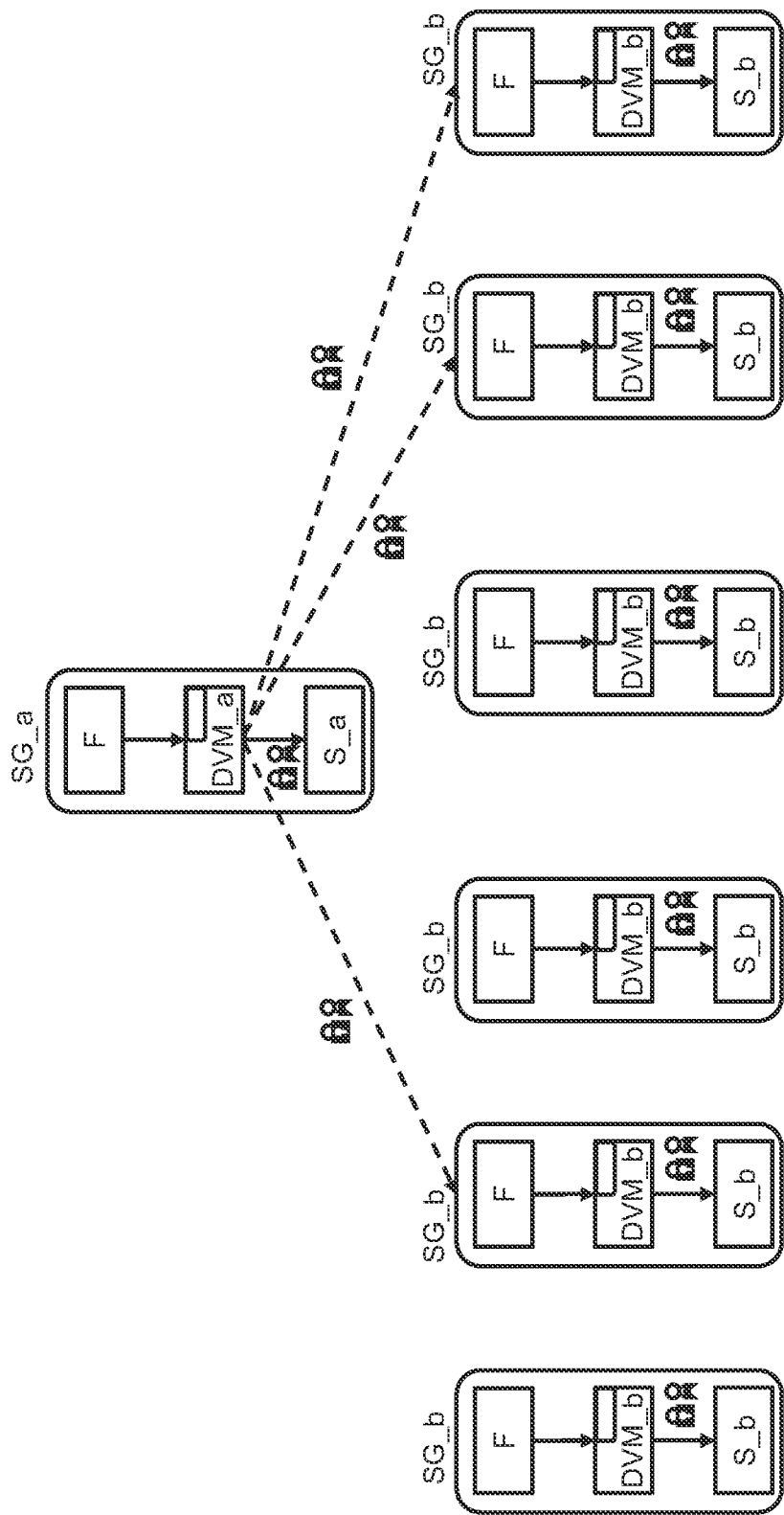
FIG. 3 shows schematically a plurality of control devices, wherein, using a configuration present in a first control device, a distributed data stored takes place in some of the other storage devices according to some aspects of the present disclosure.

The authentic distributed composite data storage according to the present disclosure is further illustrated using FIG. 3. As already in FIG. 2, in the example represented here, too, a datum is transmitted by an internal function F on the first control device SG_a, initially unencrypted, to the internal data distributor module DVM_a.

The data distributor module DVM_a then transmits the marked or encrypted datum on the one hand to the internal local memory S_a. In addition to this regular storage process in the local memory, in accordance with the configuration present in data distributor module DVM_a a distributed data storage takes place in some of the other control devices SG_b connected to the first control device SG_a over the vehicle network. In the example, the marked or encrypted datum is transmitted in accordance with the configuration data to three of the six other control devices SG_b and stored there.

Through the composite data storage that thus takes place, the risk of manipulation of individual control devices can be minimized Thus, for example, in the event of intent to manipulate, all the control devices involved in the composite data storage would have to be replaced. This would then be very costly and as a rule not economical, particularly if the composite comprises control devices that can be replaced only with difficulty or at great expense.

Overall, the composite data storage according to the present disclosure can be integrated seamlessly into a typical automotive software architecture and occasions only very minor changes, if any, in other software modules.

The method according to the present disclosure is preferably executed as a computer program on a control device. To this end the computer program is transferred to a memory of the respective control device in the manufacture of the control device and stored there. The computer program comprises instructions that, upon execution by a processor of the control device, cause the control device to execute the steps according to the method according to the present disclosure. The processor can comprise one or multiple processor units, for example microprocessors, digital signal processors or combinations thereof.

The memory can have volatile as well as non-volatile memory areas and can, for example, be configured as a semiconductor memory. Furthermore, the memory can consist of a memory chip, possibly with multiple partitions for data of different categories that are separate from one another, or multiple memory chips separated from one another for data of different categories. The memory chips can, for example, be configured as random access memory (RAM), dynamic random access memory (DRAM), EPROM or flash memory, wherein it may be ensured through a constant power supply that the data set is not lost.

Figure 4:
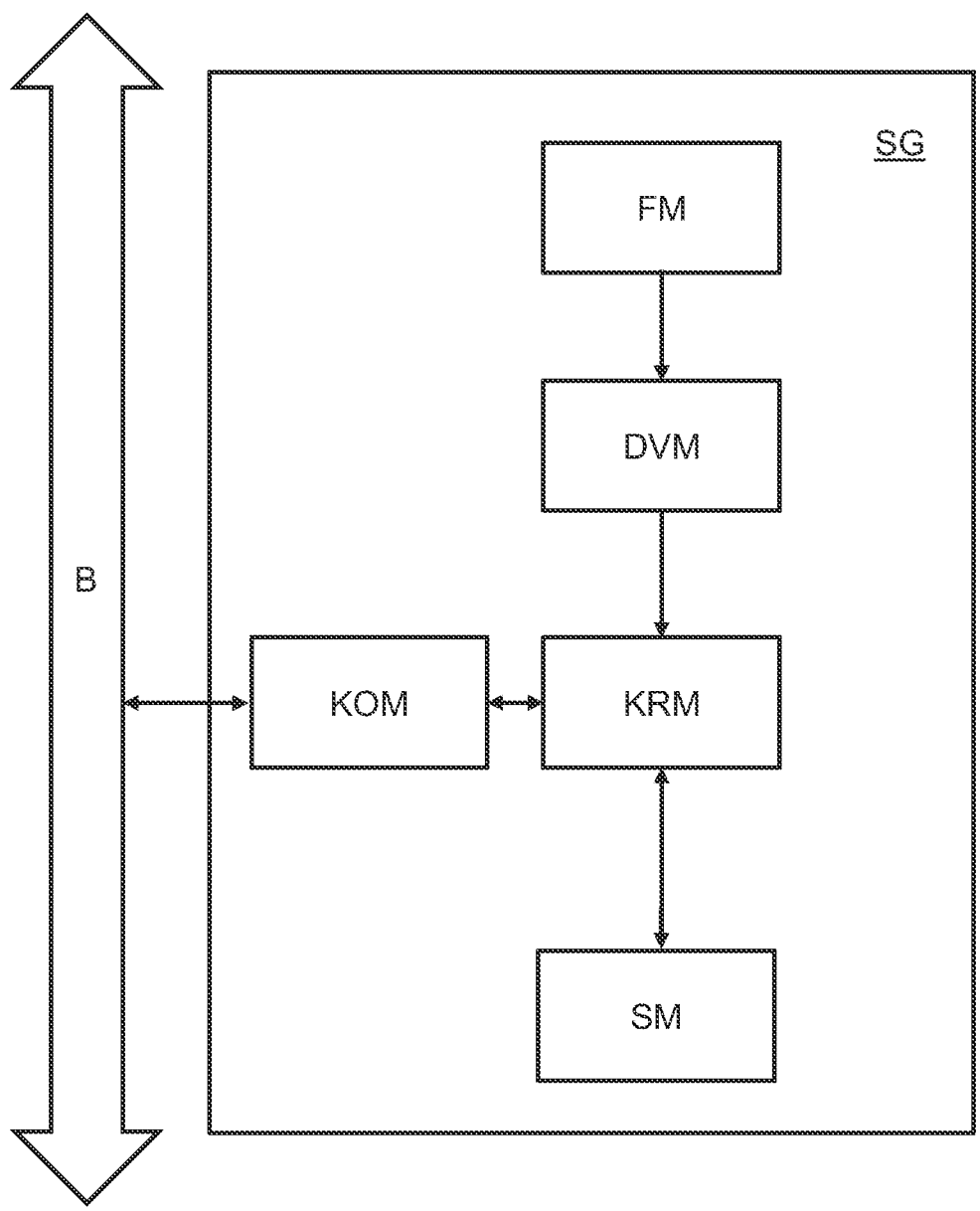
FIG. 4 shows schematically a block diagram of a control device, according to some aspects of the present disclosure.

FIG. 4 shows schematically a block diagram of a control device according to the present disclosure. In this example, the control device can be provided to control any functionalities of a vehicle and to this end can have the greatest variety of functions and software applications. For example, this may be an airbag control device that provides data in the event of the vehicle being involved in an accident, such as the deployment of an airbag or the so-called crash severity, or an engine control device that provides data with regard to the vehicle's operating hours.

The control device SG has various modules for the execution of the method according to the present disclosure, which may be implemented as software or hardware. Here a function module FM generates data, for example based on signals from one or more of the vehicle's sensors. Furthermore, a data distributor module DVM is provided that, as described above, regulates the distributed storage and securing and data using configuration data filed there. In a cryptography module KRM the data are marked and/or encrypted before they are stored locally in a memory module SM and by means of a communication module KOM are sent over an electronic network of the vehicle to one or multiple control devices not shown here. The network is structured in particular as a bus system B, for example as a CAN, MOST, FlexRay, or automotive ethernet bus.

LIST OF REFERENCE SYMBOLS 1-9 process steps
SG_a, SG_b, SG control device
DVM_a, DVM_b, DVM data distributor module
S_a, S_b memory
F function
K configuration data
FM function module
KRM cryptography module
SM memory module
KOM communication module
B electronic network

The invention claimed is:
1. A method for data backup in a vehicle, comprising:
generating a datum by a function implemented on a first control device of the vehicle;
determining a type of securing to be performed, based on configuration data of the first control device comprising instructions for the backup of data to be stored;

cryptographically marking and/or encrypting the generated datum based on the determined type of securing to be performed;

storing the cryptographically marked and/or encrypted datum in a memory of the first control device; and transmitting the cryptographically marked and/or encrypted datum or a value derived therefrom, to at least one second control device, according to data distribution rules specified from the type of securing to be performed.

2. The method according to claim 1 wherein the cryptographically marked and/or encrypted datum or the value derived therefrom is transmitted over an electronic network of the vehicle to the second control device of the vehicle.

3. The method according to claim 1, further comprising:
receiving the cryptographically marked and/or encrypted datum or the value derived therefrom by the second control device; and
storing the received datum or the value derived therefrom in a memory of the second control device.

4. The method according to claim 1, wherein using the configuration data comprises determining which data of the generated datum should be protected.

5. The method according to claim 4 wherein the configuration data comprise instructions identifying which data should be protected, and which cryptographic method is used to protect the data.

6. The method according to claim 4, wherein the configuration data comprises instructions identifying which other control devices the data to be protected should be sent.

7. The method according to claim 1, further comprising activating distributed storage of the cryptographic marking and/or encryption if a predefined event is detected.

8. The method according to claim 7, wherein activating the distributed storage comprises activating the distributed storage if a warning message, based on a possible malfunction of the vehicle electronics or a recognized attack on a component of the vehicle electronics, is detected.

9. A control device for data backup in a vehicle, comprising:
a function module for generating a datum;
a data distributor module for determining a type of securing to be performed, based on configuration data, comprising instructions for the backup of data, stored in the data distributor module;
a cryptography module for marking and/or encrypting the generated datum, based on the type of securing to be performed;
a memory module for storing a cryptographically marked and/or encrypted datum; and
a communication module for transmitting a cryptographically marked and/or encrypted datum or a value derived therefrom, to at least one other control device, according to data distribution rules specified from the type of securing to be performed.

10. The control device according to claim 9 wherein the data distributor module is configured, using the configuration data filed in the data distributor module, to decide whether a datum generated should be protected.

11. The control device according to claim 9, wherein the data distributor module is configured, using the configuration data filed in the data distributor module, to decide which data generated should be protected by different cryptographic methods.

12. The control device according to claim 9, wherein the data distributor module is configured, using the configuration data filed in the data distributor module, to decide which other control devices the cryptographically protected data are transmitted.

13. The control device according to claim 12, wherein the communication module is configured to receive a cryptographically marked and/or encrypted datum or a value derived therefrom, from another control device.

14. The control device according to claim 9, the data distributor module is configured activate distributed storage of the cryptographic marking and/or encryption if a predefined event is detected.

15. The control device according to claim 14, wherein the data distributor module is configured to activate the distributed storage if a warning message, based on a possible malfunction of the vehicle electronics or a recognized attack on a component of the vehicle electronics, is detected.

16. A non-transitory computer readable medium comprising program instructions for data backup in a vehicle, wherein execution of the program instructions by one or more processors of a computer system causes the one or more processors to carry out the steps of:
generate a datum by a function implemented on a first control device of the vehicle;
determine a type of securing to be performed, using configuration data of the first control device comprising instructions for the backup of data to be stored;
cryptographically mark and/or encrypt the generated datum based on the determined type of securing to be performed;
store the cryptographically marked and/or encrypted datum in a memory of the first control device; and
transmit the cryptographically marked and/or encrypted datum or a value derived therefrom to at least one second control device, according to data distribution rules specified from the type of securing to be performed.

17. The non-transitory computer readable medium according to claim 16, further comprising:
receiving the cryptographically marked and/or encrypted datum or the value derived therefrom by the second control device; and
storing the received datum or the value derived therefrom in a memory of the second control device.

18. The non-transitory computer readable medium according to claim 16, wherein using the configuration data comprises determining which data of the generated datum should be protected.

19. The non-transitory computer readable medium according to claim 18, wherein the configuration data comprise instructions identifying which data should be protected, and which cryptographic method is used to protect the data.

20. The non-transitory computer readable medium according to claim 19, wherein the configuration data comprises instructions identifying which other control devices the data to be protected should be sent.

* * * * *